United States Patent Office 2,941,931
Patented June 21, 1960

2,941,931

COMPOUNDS OF ZIRCONIUM AND METHODS OF PREPARING SAME

Reginald S. Dean, Hyattsville, Md., assignor to Chicago Development Corporation, Riverdale, Md., a corporation of Delaware No Drawing. Filed Dec. 22, 1958, Ser. No. 781,946

2 Claims. (Cl. 204—61)

This invention relates to zirconium compounds. It relates especially to compounds derived from a composition having approximately the empirical formula ZrCl.

In my copending applications of which this application is a continuation in part;

Serial No. 729,562, filed April 21, 1958
  Serial No. 740,568, filed June 9, 1958
  Serial No. 742,048, filed June 16, 1958

I have disclosed the existence of a composition in the form of dark shiny flakes, analyzing approximately ZrCl. I have disclosed methods for producing the composition by fused salt electrolysis.

This invention relates to improved methods for the production of the composition, whereby it is produced in large flakes with a minimum of included salt and which can be purified by leaching with dilute acid and drying rapidly.

PREFERRED METHOD OF MANUFACTURE

This method consists in electrolyzing a melt of 65% $SrCl_2$–35% NaCl containing about 3% zirconium as a salt soluble in dilute HCl, using a comminuted zirconium anode contained in an annular basket surrounding an inert cathode such as a graphite rod. The cell is a cylindrical one of stainless steel provided with an inert atmosphere and means for separating the cathode deposit from the molten salt without exposure to air. The temperature is about 1200° F. The current density on the cathode is about 200 amperes per square foot. In addition to replenishment by anode solution, $ZrCl_4$ is periodically added to the bath. Analysis of the salt around the cathode on which the composition is formed shows an average valence of about 1.4 as determined by reduction of ferric chloride solution and total zirconium by standard methods. The salt around the cathode evolves about 4 ml./gram of hydrogen when dissolved in ferric chloride solution.

The deposit of the composition formed on the cathode is composed of large shiny flakes with only a small amount of enclosed salt, analyzing as indicated above. Washing with dilute acid and drying provides a composition analyzing from 25–28% Cl, balance substantially zirconium. A preferred method of preparing the electrolyte is to start with an initial electrolyte containing about 6% $MnCl_2$, dissolved a melt of 65% $SrCl_2$–35% NaCl and carry out the electrolysis using a comminuted zirconium anode. After several runs, the cathode deposit, which is at first granular, becomes flaky and contains about 0.5% Mn. After several more runs, the manganese is reduced to .01% or less.

It has been found that higher melting electrolytes such as NaCl may be used and other methods of producing the electrolyte described may be used.

CHEMICAL ANALYSIS OF THE COMPOSITION

A spectrographic analysis of the flakes produced from commercial zirconium scrap containing 1.8% Hf and 0.2% Ti by the above described procedure was as follows:

| | Percent |
|---|---|
| Hf | .01 |
| Ti | .001 |
| Mn | .01 |
| Fe | .001 |
| Si | .001 |

The extraordinary purity of the product, particularly the substantial absence of Hf and Ti, is noteworthy.

CRYSTAL STRUCTURE

The composition of my invention is in the form of flakes of varying size. It is particularly characterized by its crystal structure as determined by X-ray spectrometry. The following table shows the X-ray analysis of a typical sample of the composition of my invention compared to iodide process zirconium.

Table

| Miller Indices, hkl. | Iodide Zirconium | | Composition of Present Invention | |
|---|---|---|---|---|
| | Interplanar Spacing A. | Intensity | Interplanar Spacing A. | Intensity |
| | | | 9.8 | S |
| | | | 8.8 | VS |
| | | | 2.98 | W |
| | 2.83 | F | 2.88 | F |
| 100 | 2.79 | F | 2.81 | F |
| | 2.71 | M | 2.73 | M |
| 002 | 2.56 | W | 2.60 | F |
| 101 | 2.45 | S | 2.48 | S |
| 102 | 1.89 | F | 1.91 | W |
| 110 | 1.61 | W | 1.63 | F |
| 103 | 1.46 | W | 1.47 | F |
| 112 | 1.37 | W | 1.38 | F |
| 201 | 1.35 | F | 1.36 | F |

These measurements clearly show that my composition is characterized by planes of zirconium atoms in the alpha form with only a very slight expansion of the interplanar spacing over zirconium made by the iodide process, and uniquely by interplanar spacings of a different magnitude, namely nearly four times that of the metallic planes. For comparison, graphite which has a similar structure shows for 110, 1.42 A. and the distance between atoms in adjacent basal planes as 3.35, compared to 8.8–9.8 A. in the compound of my invention. To find unit cells with planar spacing comparable to that of my invention, it is necessary to go to organic compounds, e.g., polyvinylidene chloride has an atomic spacing of 13.69 A., 4.67 A. and 6.29 A. These structural characteristics of the composition of my invention characterize it as a compound and also provide a rationalization of the properties which I have discovered in the compound.

PRESSING PROPERTIES

The composition of my invention has in the form of flakes, a density of 4.00 as determined by pycnometer using chloroform as the liquid. The composition can be pressed in a die at 10–150,000 p.s.i. to form a compact with a density of 3.95 when the flakes are randomly oriented or 3.90 when the flakes are oriented in the flat position in the die. By hot pressing at 500° C., the density may be brought to 4.4 which, however, falls to 4.0 by "stress relief" at 200° C.

A cylindrical compact pressed from random oriented flakes has a compressive strength of about 40,000 p.s.i., of flatly oriented flakes of about 32,000 p.s.i. The cylinder fails by basal slip. The longitudinal compression before failure is about 10% and the lateral expansion about 1%.

When compressed in a die, the composition remains elastic to at least 150,000 p.s.i. and shows a uniform elastic compression of about 0.1 in./inch. There is no substantial difference between oriented and unoriented flakes so far as compression in a die is concerned.

The compacts of the composition of my invention has very low tensile strength. This may be greatly increased, however, by reinforcing with metal wires or other fibres. Metal wire reinforcing is particularly effective if the wires are precoated with the composition by drawing through a die lubricated with the composition. This produces great adherence to the wire which can then be cut into short lengths for reinforcing.

The elastic properties of the composition are not greatly affected by temperature up to 400° C. Between 400° C. and 600° C. the composition is thermoplastic and may be extruded. The extruded material is not substantially changed in room temperature properties. Above 600° C., the composition loses its thermoplastic properties and may be heated to 1000° C. without further change. Material so heated is normally elastic up to 1000° C.

The pressing properties of the composition as above set forth make it uniquely suitable for high temperature packing, such as O rings.

LUBRICATING PROPERTIES

The composition of my invention is "graphitic" in the sense that the slip of the planes over each other is much greater in one direction than in the others. This slip like that of graphite is parallel to the basal plane in this instance made up of the hexagonal alpha zirconium arrangement of atoms. The strength along the basal plane is, so far as may be determined that of metallic zirconium, the shearing strength is low due probably to the distance apart of the basal planes. This "graphitic" slip of the composition of my invention is the probable explanation of the lubricating properties which I have discovered in the composition of my invention.

To illustrate the lubricating properties of the compound of my invention, I have drawn titanium wire through a carbide die with a reduction from .140 in dia. to 1.25 dia. I have done this using no lubricant, graphite lubricant, beeswax lubricant, and the compound of my invention, and noted the pull necessary. The results follow:

| No Lubricant, lbs. | Graphite, lbs. | Beeswax, lbs. | Composition of this Invention, lbs. |
|---|---|---|---|
| 500 | 400 | 350 | 250 |

In the case of the graphite and beeswax, the lubricant was entirely removed by the drawing process. With the compound of this invention, a tightly adherent continuous coating is left on the wire which permits further reduction through several dies without loss of lubricating properties.

The compound of my invention may be mixed with other lubricants and plastics as is done with graphite and graphitic compounds like $MoS_2$. Such admixture is, however, not necessary with the compound of my invention to obtain adherence to the surface to be lubricated. Further, these admixtures lower the temperature at which the lubricant can be used. The compound of my invention retains its lubricating properties up to 1000° C.

The lubricating properties of the composition as above set forth make it useful for high temperature and high pressure lubricants and with suitable reinforcing for oil less bearings and the like.

ELECTRICAL PROPERTIES

The individual flakes of the composition of my invention are electrical conductors of highly varying magnitude. Specific resistances of the flakes as formed vary from 1–1000 ohm cm. If a voltage of 2–3 volts is placed across a flake from surface to surface, the conductivity is decreased by jumps indicating the breakdown of good conducting paths through the flake. In this way, the resistance is brought into a range of about 100 ohm cm. By heating to 200° C. the resistance is increased to about 1000 ohm cm. Flakes treated in this way are highly pressure sensitive and may be reduced to ½ their resistance by a pressure of 100 grams.

Compacts of the flakes are similarly variable in resistance and subject to the same changes on treatment as the individual flakes.

FREE ENERGY

The flakes are sufficiently good conductors to form a cell when coupled in a suitable electrolyte with manganese dioxide. Such a cell using 10% hydrochloric acid has a voltage of 1.85 v.

Based on a cell reaction of $$ZrCl + 2MnO_2 + 8HCl \rightarrow ZrCl_4 + 2MnCl_2 + 4H_2O$$

the free energy of the composition of my invention is 68,400 cal. This corresponds to 208,000 for $ZrCl_4$, 183,000 for $ZrCl_3$ and 135,000 for $ZrCl_2$. These free energies may be arbitrarily made up of 75,000+35,000 X valence. Applying this arbitrary formula to the composition of my invention, it will be seen that the valence factor disappears. That is chlorine has no true valence in the composition of my invention so far as its contribution to the free energy of the composition is concerned.

REPLACEMENT REACTIONS

Since the chlorine in the composition of my invention may be considered interstitial in the lattice of widely spaced zirconium layers, it may be replaced in some instances without destroying the layered lattice.

In the simplest instance, it may be replaced by hydroxyl with the evolution of hydrogen in dilute acid. Such hydrolyzed composition retain the flaky structure of the original compound and have about the same free energy as judged from their cell reactions. Hydrolysis may, however, proceed further with disintegration of the structure.

The chlorine in the composition of my invention may be partially or wholly replaced in its interstitial position by organic radicals. The reactions for accomplishing this are borrowed from Organic Chemistry and are carried out in non-hydroxylated solvents such as ether or benzene. Typical reactions are the Williamson type synthesis $$ZrCl + RONa \text{ (in ether)} \rightarrow ZrOR + NaCl$$

The R may be any aliphatic or aromatic residue containing 2–12 carbon atoms; and the Friedel and Crafts type synthesis $$ZrCl(AlCl_3) + C_6H_6 \text{ (in benzene)} \rightarrow ZrC_6H_5 + HCl$$

This compound may be leached with benzene. Homologs of benzene may be substituted for benzene.

Another synthesis of similar nature is $$ZrCl + ROH(AlCl_3) \text{ (in benzene)} \rightarrow ZrOR + HCl$$

in which the compound may be leached with benzene.

The substitution of the organic radical increases spacing of the basal zirconium planes and hence increases electrical resistance and decreases the elastic compression modulus. It is not necessary to entirely replace the chlorine to obtain these results in a considerable degree.

The substituted compositions of my invention have exceptional thermal stability and in many instances thermoplasticity at 400–600° C. They may be heated to at least 800° C. without decomposition.

The substituted or partially substituted compositions described have greater elastic deformation at lower loads and substantially improved thermoplastic properties.

What is claimed is:

1. The method of producing a composition of matter having the approximate empirical formula ZrCl and a density of about 4.0 in which zirconium atoms are arranged in planes with the spacing found in alpha zirconium said planes being spaced at substantially greater distances than the inter-atomic distances in alpha zirconium which consists in electrolyzing a melt of about 65% $SrCl_2$–35% NaCl containing about 3% zirconium as a chloride soluble in dilute hydrochloric acid, said molten bath around the cathode having an average valence of the contained zirconium chloride of about 1.4 as determined by reduction of ferric chloride solution and total zirconium and evolving about 4 ml./gram of hydrogen when dissolved in ferric chloride solution, the temperature of electrolysis being about 1200° F., the anode consisting of comminuted zirconium metal contained in an annular basket surrounding an inert cathode, the current density on the cathode being about 200 amperes per square foot and periodically adding $ZrCl_4$ to the bath, whereby to produce the first mentioned composition in large flakes adherent to the cathode, cooling said flakes in an inert atmosphere, removing them from the cathode and separating adhering salt from the flakes.

2. The method of claim 1 further characterized by starting with an initial electrolyte containing about 6% $MnCl_2$ dissolved in the 65% $SrCl_2$–35% NaCl melt and proceeding to carry out the electrolysis with a zirconium anode in accordance with claim 1 until the deposit becomes flaky and contains only a trace of manganese, then continuing the electrolysis as in claim 1.

References Cited in the file of this patent

UNITED STATES PATENTS

| | | |
|---|---|---|
| 2,222,591 | Clarke | Nov. 26, 1940 |
| 2,309,619 | Flaxman | Jan. 26, 1943 |
| 2,439,290 | Fetterley | Apr. 6, 1948 |
| 2,616,859 | Verwey | Nov. 4, 1952 |
| 2,689,876 | Lehovec | Sept. 21, 1954 |
| 2,706,213 | Lucas | Apr. 12, 1955 |
| 2,734,856 | Schultz et al. | Feb. 14, 1956 |
| 2,741,587 | Sindeband | Apr. 10, 1956 |
| 2,834,727 | Gullett | May 13, 1958 |
| 2,864,749 | Slatin | Dec. 16, 1958 |